United States Patent [19]

Parizet

[11] Patent Number: 4,534,532
[45] Date of Patent: Aug. 13, 1985

[54] SECTION-MEMBER FOR A SLIDEWAY FOR CORRECTING THE ORIENTATION OF A SEAT, ITS METHOD OF MANUFACTURE AND THE SLIDEWAY COMPRISING SAID SECTION-MEMBER

[75] Inventor: Roger Parizet, Bonnee, France

[73] Assignee: Compagnie Industrielle De Mecanismes en abrege C.I.M., France

[21] Appl. No.: 315,785

[22] Filed: Oct. 28, 1981

[30] Foreign Application Priority Data

Nov. 5, 1980 [FR] France ................. 80 23569

[51] Int. Cl.³ .............................................. A47G 29/00
[52] U.S. Cl. ..................................... 248/371; 248/430
[58] Field of Search ............... 248/371, 393, 394, 395, 248/396, 429, 430, 424; 297/330, 344, 346; 296/65 R

[56] References Cited

U.S. PATENT DOCUMENTS

| 2,154,294 | 4/1939 | Whedon | 248/395 |
| 2,942,646 | 6/1960 | Himka et al. | 248/430 X |
| 3,350,046 | 10/1967 | Kirk | 248/430 |
| 3,756,094 | 9/1973 | Mauron | 248/429 X |

FOREIGN PATENT DOCUMENTS 1211230 11/1970 United Kingdom ............... 248/429

Primary Examiner—J. Franklin Foss

[57] ABSTRACT

A lower section-member of the orientation correcting slideway is produced by folding a blank in the shape of a diabolo into a U-section. The blank has end flanges and curved lateral guiding grooves formed therein by a press operation and openings for receiving a latch of the slideway. The section-member has a planar web which is directly fixed to the web of an upper section-member of a slideway for longitudinally adjusting the position of the seat. Application in automobile vehicle seats.

1 Claim, 4 Drawing Figures

1

SECTION-MEMBER FOR A SLIDEWAY FOR CORRECTING THE ORIENTATION OF A SEAT, ITS METHOD OF MANUFACTURE AND THE SLIDEWAY COMPRISING SAID SECTION-MEMBER

DESCRIPTION

The present invention relates to section-members for orientation correcting slideways for supporting seats, and in particular automobile vehicle seats, of the type having a generally U-shaped cross-section whose web has a constant width and defining at least one curved lateral guideway. These section-members are usually combined by an interfitting assembly with another similar section-member, with interposition of rolling or sliding members, such as balls, so as to constitute slideways.

Up to the present time, for producing such section-members, the method has comprised the steps of starting with a rectilinear section-member which has the desired cross-sectional shape, and cambering or bending said section-member in such manner as to produce a guideway of the desired curvature.

This method has many drawbacks. In particular, the bent section-member must be secured to its support structure which is usually either the seat itself or a rectilinear longitudinal slideway for adjusting the longitudinal position of the seat, by means of U-shaped front and rear members or clevises. For reasons of cheapness and in order to permit dismantling, these clevises are bolted on one side and welded on the other. In the event of a shock or impact, the clevises are subjected to bending stress and there is a high risk of deformation of the clevises and of fracture of the welds, above all when the safety belt is directly secured to the seat. In addition, there are manufacturing difficulties relating to the bending operation and to the increase in the number of parts of the sub-structure of the seat. Further, the locking notches must be re-formed after the bending operation owing to the fact that they are deformed by the bending operation.

An object of the invention is to provide a section-member for an orientation correcting slideway which is cheaper and more reliable.

The invention consequently provides a section-member of the aforementioned type wherein the web of the section-member is planar.

In advantageous embodiments:

the section-member comprises in at least one of its side walls a series of openings of general orientation perpendicular to the axis of the guideway;

the side walls terminate in longitudinal flanges which are formed over at a right angle inwardly of the section-member;

the web includes bolt apertures.

Another object of the invention is to provide a method for producing such a section-member.

According to this method, there is formed a planar blank having a generally diabolo shape provided with the guideway and possibly with openings, flanges and/or bolt apertures, and the two lateral regions of this blank are folded at a right angle along two parallel longitudinal fold lines.

A further object of the invention is to provide an orientation correcting slideway comprising two section-members which are fitted together and at least one of which members is such as defined hereinbefore.

The invention will be described in more detail hereinafter with reference to the accompanying drawings which represent solely one embodiment.

Figure 2:
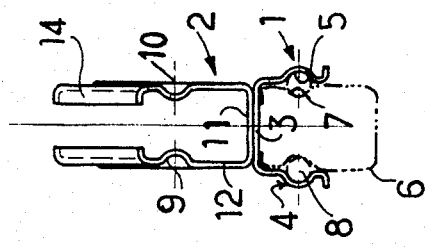
FIG. 2 is an end elevational view, in the direction of arrow 2 of FIG. 1, of the structure shown in FIG. 1.
Figure 1:
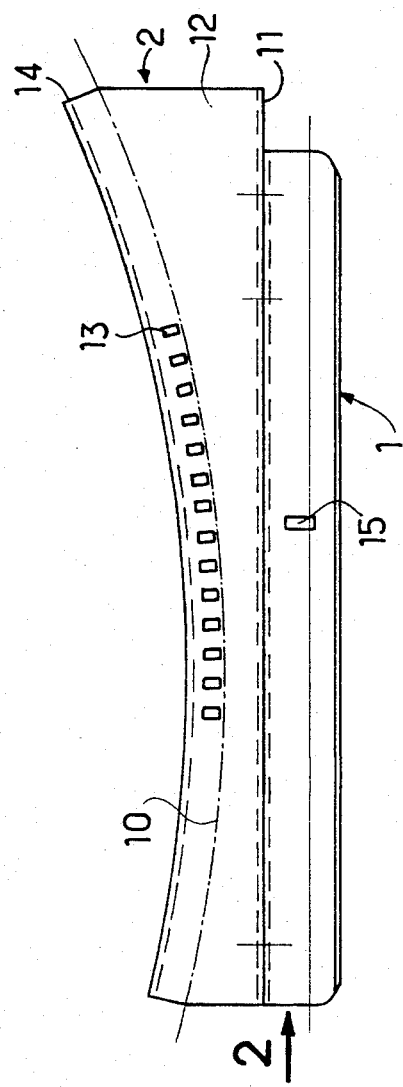
FIG. 1 is a side elevational view, of a part of a sub-structure of a seat comprising a section-member according to the invention.

FIGS. 1 and 2 show two metal section-members fixed together: a lower section-member 1 which constitutes the outer section-member of a rectilinear slideway for longitudinally adjusting the position of a vehicle seat (not shown), and an upper section-member 2 which constitutes the inner section-member of an orientation correcting slideway.

The section-member 1 has a generally inverted U-sectional shape including a planar centre web 3 of constant width and two downwardly extending side branches 4. Each branch 4 has a longitudinal extending groove 5 which faces inwardly of the section-member, the two grooves 5 being in confronting relation. As shown diagrammatically in dot-dash lines in FIG. 2, the section-member 1 is adapted to fit on another rectilinear section-member 6 having an upright U-sectioned shape, each of the branches of the U having an outwardly open groove 7 in confronting relation to a groove 5. The grooves 5 and 7 together define two runways for balls 8, and the web of the section-member 6 is adapted to be secured to the floor of an automobile vehicle.

The upper section-member 2 has also throughout its length an upright U-section shape, but the height of the branches of this U vary along its length from one end, this height decreasing to roughly midway along this length and then increasing. In each section of the section-member 2, each branch of the U has an outwardly open recess 9, the two recesses being at the same level. The assembly of the recesses 9 constitutes on each side an outwardly open curved longitudinally extending groove, the axis 10 of which is shown in dot-dash line in FIG. 1, this longitudinal groove having a longitudinal profile in the shape of an arc of a circle whose concavity faces upwardly.

The section-member 2 has consequently a planar lower web 11 of constant width equal to the width of the section-member 1 and two side walls 12 having a generally vertical orientation. Above the axis 10, each side wall 12 is provided with a series of roughly rectangular openings 13. The lower edges of all these openings are disposed at the same distance above the axis 10, and their large axes are all oriented toward the centre of the corresponding circle. The side walls 10 terminate in an upper flange 14 which is formed over a right angle inwardly of the section-member 2.

The web 11 is applied against the web 3 of the section-member 1 and is secured to the latter at as many points as necessary, for example by a bolting together so as to permit the use of the rectilinear slideway 1-6 alone for supporting a seat which does not have an adjustable orientation. The section-member 2 is adapted to cooperate with another section-member (not shown) which is fitted thereon and has two grooves of the same axis 10 as those of the section-member 2 but open inwardly of the section-member, the assembly of the four grooves defining two curved raceways for balls (not shown). This outer section-member has an inverted U-section shape and its web is adapted to be fixed under the seat to be supported. The movement of the outer section-member along the section-member 2 modifies the orientation of the seat by a rotation of the latter about the common horizontal axis of the two arcs of a circle 10.

Normally, two assemblies of four section-members are provided, such as defined hereinbefore, so as to constitute a seat sub-structure with one assembly on each side of the seat. Each assembly further comprises two locking mechanisms; namely, for the longitudinal adjustment, a latch (not shown) extends through a lateral opening 15 of the section-member 1 and is inserted, when released, into one of a series of lateral openings (not shown) in the section-member 6. Likewise, for adjusting the orientation of the seat, at latch (not shown) extends through an opening of the orientation correcting outer section-member and is inserted, when released, into one of the openings 13 of the associated section-member 2. The flanges 14 are inserted between the web of the outer section-member and a longitudinal rail welded to the inner surface of this web.

Figure 4:
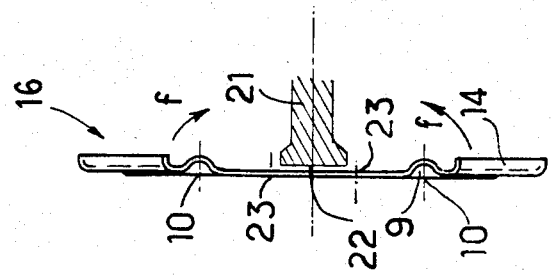
FIG. 4 is an end elevational view, in the direction of arrow 4 of FIG. 3, of the blank which illustrates the folding operation.
Figure 3:
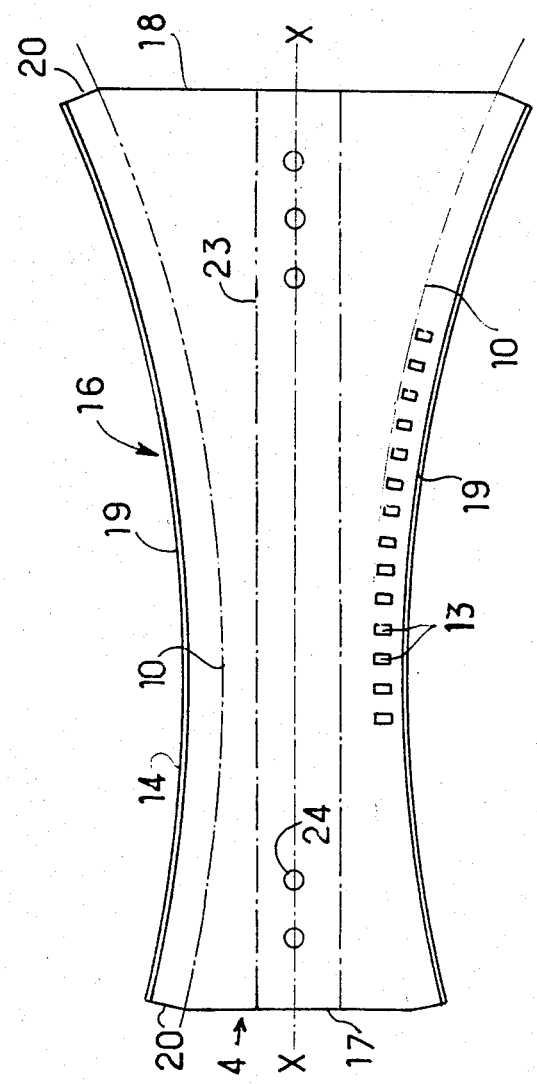
FIG. 3 is a plan view of a sheet blank for producing a section-member according to the invention.

The section-member 2 is made from a sheet metal blank 16 shown in FIGS. 3 and 4. This blank, when viewed in plan (FIG. 3), has the general shape of a diabolo which is symmetrical with respect to a general longitudinal axis of symmetry X—X; it has two end edges or sides 17, 18 perpendicular to the axis X—X (the rear edge 18 being a little longer than the edge 17 in this embodiment), and two concave lateral sides 19 having the shape of an arc of a circle.

The blank 16 is roughly planar. However, it already has two curved grooves having axes 10 and formed-over flanges 14 which extend along the sides 19. These projections are produced by a press operation on the initially planar sheet. Note that outwardly beyond each axis 10, the sides 17, 18 have a portion 20 having a radial orientation with respect to this axis. The openings 13 are provided previously along an axis 10, their shape and their radial orientation being definitive relative to this axis.

By means of a punch 21 having a rectangular active surface 22 shown in FIG. 4, and a corresponding die (not shown), the blank 16 is folded along two longitudinal fold lines 23 parallel to the axis X—X, in the direction of arrows f of FIG. 4 which then results in the section-member 2 of FIGS. 1 and 2. Bolt apertures 24 previously punched in the blank 16 along the axis X—X are shown in FIG. 3.

Thus, the section member 2 is produced from a planar sheet by a press operation (curved grooves and flanges 14) and then by a folding operation without any other bending operation being necessary. It is directly fixed to a planar support, such as the web 3 of the section-member 1, with no intermediate element subjected to bending stress and, if it is desired to render the section-member 2 detachable, without welding, which renders the assembly very reliable in the event of shock or impact. Further, the excess sheet metal of the side walls 12 of the section-member 2 does not increase the weight of the sub-structure and even reduces it, since the weight of this excess sheet metal does not exceed that of two clevises of necessarily great thickness employed in the aforementioned prior art.

Note moreover that owing to the absence of deformation of the openings 13, the slideway can be locked in the desired position without play or jamming.

It will be understood that the outer section-member of the orientation correcting slideway may be constructed and formed in the same way as the section-member 2 which, here again, dispenses with any intermediate fixing means between this section-member and the seat, improves the reliability of this fixing, slightly lightens the section-member and avoids the cambering operation.

Having now described my invention what I claim as new and desire to secure by Letters Patent is:

1. A section-member for correcting the orientation of a seat, and in particular a vehicle seat, having a generally U-shaped cross-sectional configuration, the section-member comprising a generally diabolo-shaped planar blank having opposed lateral regions thereof folded along parallel fold lines to form a web having a constant width and two side walls defining at least one curved upwardly open guideway, said web being planar, at least one of said side walls being provided with a series of openings having a general orientation perpendicular to the curved axis of the guideway, and said side walls terminating in longitudinally extending inwardly directed right angle flanges.

* * * * *